United States Patent [19]

Hasselbach

[11] 3,815,924

[45] June 11, 1974

[54] SOUND REPRODUCING APPARATUS

[75] Inventor: Wolfgang Hasselbach, Konigstein, Germany

[73] Assignee: Braun AG, Frankfurt, Germany

[22] Filed: June 24, 1971

[21] Appl. No.: 156,568

Related U.S. Application Data

[63] Continuation of Ser. No. 825,184, May 16, 1969, abandoned.

[30] Foreign Application Priority Data

May 18, 1968 Germany .......................... 1772463

[52] U.S. Cl. .............................................. 274/23 R
[51] Int. Cl. ............................................. G11b 3/28
[58] Field of Search .................................. 274/23 R

[56] References Cited

UNITED STATES PATENTS

| | | | |
|---|---|---|---|
| 2,526,188 | 10/1950 | Andres | 274/23 X |
| 2,665,919 | 1/1954 | Baker | 274/23 R |

*Primary Examiner*—Louis R. Prince
*Assistant Examiner*—Charles E. Phillips
*Attorney, Agent, or Firm*—Michael S. Striker

[57] ABSTRACT

A record player wherein the pressure between the needle of the tone arm and a record is adjustable by changing the bias of a biasing device which includes a cord connected to a helical spring. The tone arm is mounted on a horizontal shaft which is rotatably supported by a vertical shaft so that the tone arm can turn with either shaft. One end of the biasing device is connected to the tone arm and its other end is directly or indirectly connected with a support of the record player. An intermediate part of the cord is trained over a pulley which is mounted on the horizontal shaft or on the support; in the first instance, the bias of the biasing device is adjusted by changing the position of the other end with reference to the support. In the second instance, the bias of the biasing device is adjusted by changing the position of the pulley with reference to the support and/or by changing the position of the other end relative to the support.

8 Claims, 3 Drawing Figures

SOUND REPRODUCING APPARATUS

This is a continuation of Ser. No. 825,184, filed May 16, 1969, now abandoned.

BACKGROUND OF THE INVENTION

The present invention relates to sound reproducing apparatus in general, and more particularly to improvements in record players wherein the needle of a tone arm engages the sound groove of a rotating record. Still more particularly, the invention relates to improvements in means for adjusting the pressure between the needle of the tone arm and the record in a sound recording apparatus.

It is known to mount the tone arm of a record player in such a way that the tone arm can turn about horizontal and vertical axes, i.e., that the needle can move radially of the record when the tone arm turns about the vertical axis and that the needle can be moved toward and away from the sound groove when the tone arm turns about the horizontal axis. The pressure between the needle and the record is regulated by an adjustable spring which tends to press the needle of the properly balanced tone arm against the record with a desired force. As a rule, the spring which biases the needle is connected to the tone arm and to the shaft which defines the vertical axis and carries a second shaft defining the horizontal axis. The bias of the spring is adjusted by moving one of its ends with reference to the tone arm or with reference to the vertical shaft.

A drawback of such adjustments is that the bias of the spring can be changed only by touching the vertical shaft and/or the tone arm whereby the balance of the tone arm is likely to be upset or the needle or the record damaged if the adjustment results in generation of excessive pressure. Therefore, such conventional adjustment is normally carried out while the needle is disengaged from the record. Consequently, proper adjustment of the spring bias can be achieved only while the apparatus is idle and as a result of several trials, namely, until the person in charge happens to select a spring bias which is best suited for reproduction of sound.

SUMMARY OF THE INVENTION

An object of the invention is to provide a sound reproducing apparatus, particularly a record player, wherein the needle of the tone arm engages the sound groove of a revolving record and to mount the tone arm in such a way that the pressure between its needle and the record can be readily adjusted when the apparatus is in use.

Another object of the invention is to provide a sound reproducing apparatus of the just-outlined character, wherein the antiskating moment of the tone arm can also be adjusted when the apparatus is in use.

A further object of the invention is to provide an apparatus wherein the antiskating moment of the tone arm can be adjusted simultaneously with or independently of the pressure between the record and the needle.

An additional object of the invention is to provide an apparatus wherein the pressure between the record and the needle of the tone arm can be adjusted independently of the antiskating moment of the tone arm.

Still another object of the invention is to provide a device for adjusting the pressure between the needle abd the record in a sound reproducing apparatus which can be readily installed in presently known sound reproducing apparatus.

The improved sound reproducing apparatus comprises a support, a first pivot member which is mounted on the support and defines a preferably vertical first axis; a second pivot member mounted on the first pivot member and defining a preferably horizontal second pivot axis which intersects the first axis, an elongated tone arm mounted on the second pivot member and having a record-engaging needle remote from the second axis, adjustable elongated biasing means having a first portion fixed to the tone arm at a point remote from the needle and a second portion directly or indirectly secured to the support, guide means engaging the biasing means in such a way that the biasing means tends to turn the tone arm about the second axis to thereby urge the needle against a record with a force which is a function of the bias of the biasing means, and adjusting means for adjusting the bias of the biasing means.

The biasing means preferably comprises a helical spring or another suitable resilient element and an elongated flexible element, such as a cord or a cable. The guide means preferably comprises a pulley which is mounted on the second pivot member or on the support. If the pulley is mounted on the second pivot member, the adjusting means preferably comprises a screw or the like which connects the second portion of the biasing means to the support in such a way that the second portion is movable between several positions each of which corresponds to a different bias of the biasing means.

If the pulley is mounted on the support, the adjusting means preferably comprises means for adjusting the position of the pulley with reference to the support by moving the pulley at right angles to the longitudinal direction of the tone arm, at right angles to the first axis and/or in the direction of the first axis.

The novel features which are considered as characteristic of the invention are set forth in particular in the appended claims. The improved sound reproducing apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
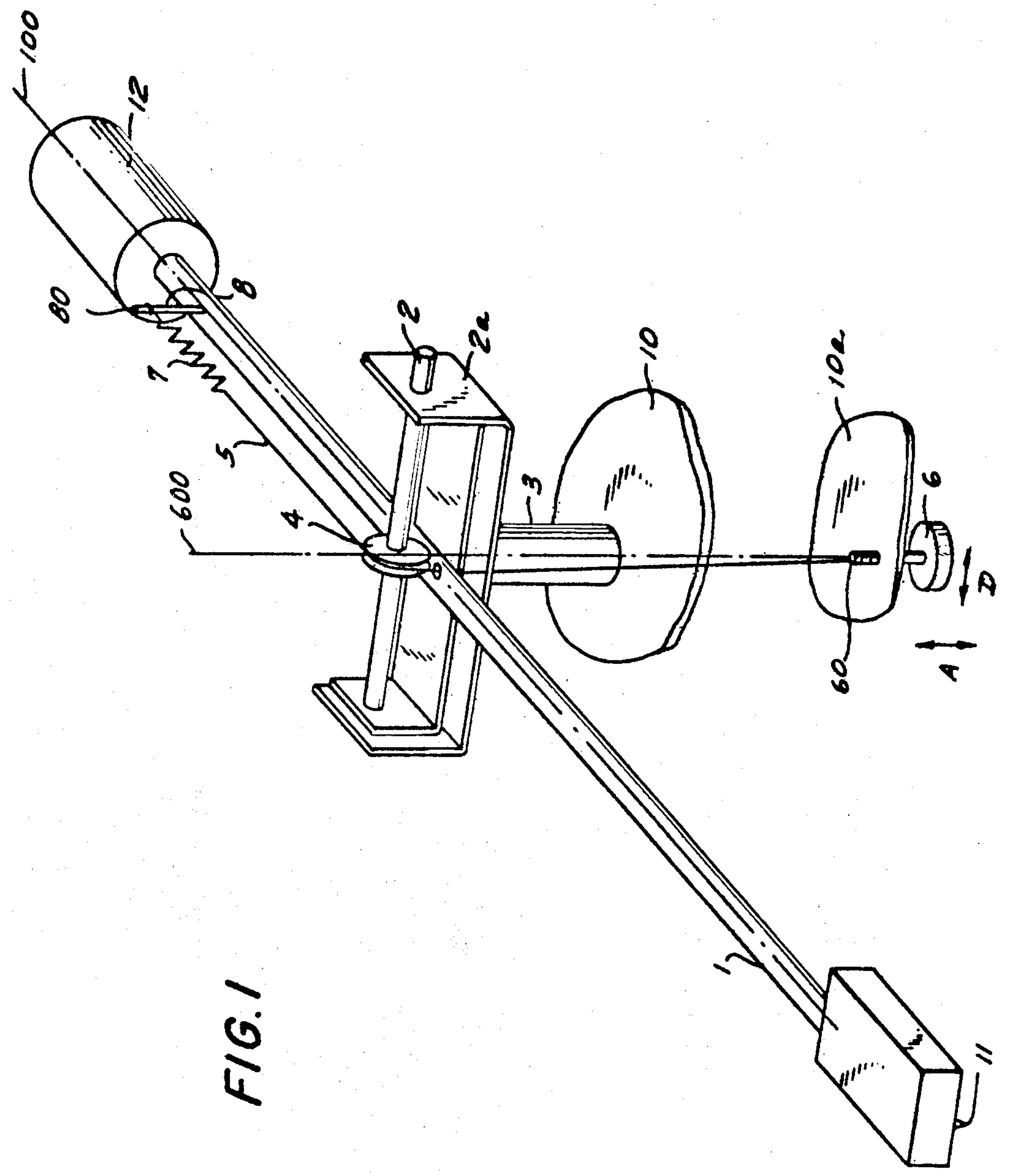
FIG. 1 is a fragmentary perspective view of a record player which embodies one form of the invention and does not comprise any means for adjusting the antiskating moment.

FIG. 1 illustrates a portion of a record player which comprises an elongated tone arm 1 one end of which carries a record-engaging needle or stylus 11. The other end of the tone arm 1 carries an adjustable counterweight or balancing weight 12. A mediah portion of the tone arm 1 is connected to a horizontal pivot member or shaft 2 which is rotatable in the arms of a U-shaped bracket 2*a* mounted at the upper end of a second pivot member or shaft 3 mounted in the housing or support 10 of the record player and turnable about a vertical axis 600. Thus, the tone arm 1 can turn about the horizontal axis of the shaft 2 and about the vertical axis 600 of the shaft 3. The shaft 2 carries a guide member here shown as a pulley or sheave 4 serving to deflect an elongated flexible element 5, for example, a thin cord or cable. One end portion 60 of the cord 5 is attached to the tip of an adjusting screw 6 whose axis coincides with the axis 600 and which meshes with a portion 10*a* of the support 10. The other end of the cord 5 is attached to one end convolution of a helical spring 7 the other end convolution of which is attached at 80 to a post 8 provided on the tone arm 1 close to the balancing weight 12. The axis of the tone arm 1 is shown at 100. When the actuating means or head of the adjusting screw 6 is rotated to move the end portion 60 of the cord 5 in one of the directions indicated by double-headed arrow A, i.e., to change the position of the end portion 60 with reference to the support 10, the bias of the spring 7 either increases or decreases whereby the spring changes the pressure between the tip of the needle 11 and the sound groove of the record. The level of the end portion 80 of the spring 7 must be selected in such a way that the spring 7 and cord 5 cooperate to produce a tilting moment about the axis of the shaft 2, and such moment increases in response to increasing bias of the spring 7. This insures a requisite pressure between the needle 11 and the record. The end portion 60 can be located at a level above or below the tone arm 1, as long as it is located on the axis 600; this insures that the spring 7 and cord 5 cannot cause rotation of the tone arm 1 about the vertical axis 600. However, if the designer considers it necessary or advisable to mount the spring 7 and cord 5 in such a way that the spring 7 tends to turn the tone arm 1 about the axis 600, the end portion 60 is placed laterally of the axis 600, preferably by displacing it in the direction of axis of the shaft 2 as indicated by the arrow D. This can serve to compensate for the so-called skating moment, namely, for the tendency of the needle 11 to move radially outwardly when its tip reaches the innermost convolution of the sound groove of the record.

The parts 5,7 together constitute an elongated biasing device which includes the end portions 60,80 and whose bias can be adjusted by screw 6 which can change the position of the end portion 60 with reference to the support 10 by moving the end portion in the direction of the axis 600.

An important advantage of the just-described apparatus is that the screw 6 can be rotated while the needle 11 engages the sound groove of a record so that the operator can change the bias of the biasing device 5,7 during reproduction of sound. This enables the operator to rapidly select the optimum bias upon the tone arm 1, i.e., the optimum pressure between the needle 11 and the record.

Figure 2:
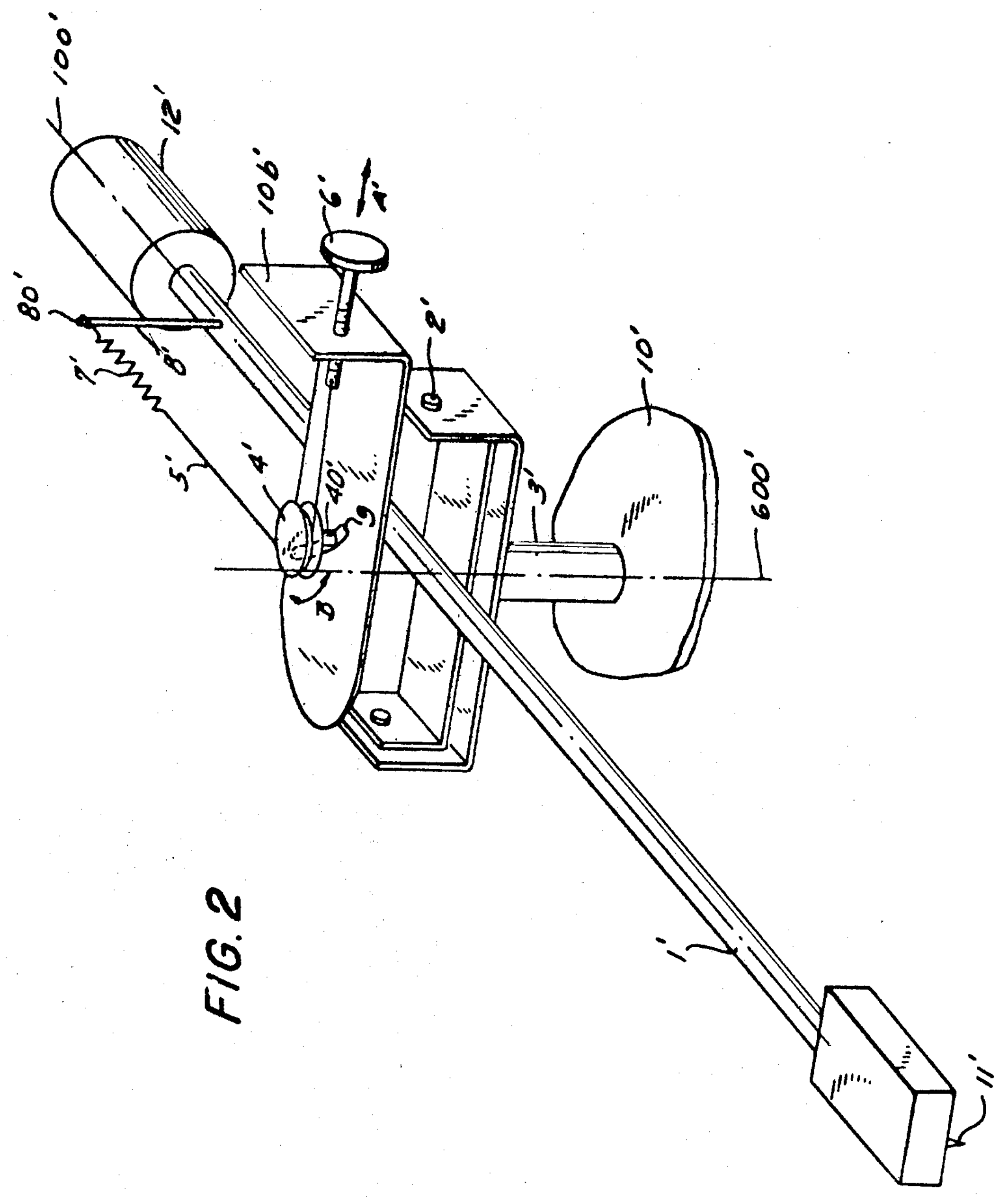
FIG. 2 is a similar fragmentary perspective view of a sound record player which is provided with means for adjusting the antiskating moment.

FIG. 2 illustrates a portion of a second record player wherein all such parts which are clearly identical with or analogous to the parts of the first record player are denoted by similar reference characters each followed by a prime. The guide member or pulley 4' is adjustably mounted on a portion 10*b'* of the support 10' and serves to deflect a flexible cable or cord 5' one end portion of which is connected to the post 8' by way of a helical spring 7' in the same way as described in connection with FIG. 1. The other end portion 60' of the cord 5' is connected to an adjusting screw 6' which is movable in parallelism with the axis of the horizontal shaft 2'. The arrow A' indicates the directions in which the screw 6' can move the end portion 60' relative to the portion 10*b'*. If the vertical axis 600' of the shaft 3' touches the periphery of the pulley 4', and if the portion of the cord 5' between the pulley 4' and the spring 7' is located in a plane which includes the axis 100' of the tone arm 1', the biasing device including the cord 5' and spring 7' does not produce a moment which would tend to rotate the tone arm 1' about the vertical axis 600'. Thus, adjustment of the end portion 60' in response to rotation of the screw 6' then merely changes the pressure between the tip of the needle 11' and the record namely, the moment which is exerted on the tone arm 1' to rotate about the axis of the shaft 2' in a counterclockwise direction, as viewed in FIG. 2.

In order to move the pulley 4' from such neutral position which reference to the axis 600', the apparatus of FIG. 2 comprises means for effecting adjustments of the shaft 40' of pulley 4' in directions indicated by a double-headed arrow B. As shown, the portion 10*b'* is provided with an arcuate guide slot 9 whereby any adjustment of the shaft 40' of pulley 4' along such slot from the aforementioned neutral position effects a change in the position of pulley with reference to the vertical axis 600' so that the tone arm 1' then tends to turn about such axis. As mentioned above, such adjustment of the pulley 4' and hence of the bias of spring 7' produces a desirable antiskating moment, namely, a moment which opposes the known skating moment (i.e., the tendency of the needle 11' to move radially outwardly of the record). It will be seen that the magnitude of antiskating moment increases proportionally with the bias of spring 7' when the pulley 4' is moved along the slot 9 away from its neutral position in which the axis 600' touches the periphery of the pulley. This is desirable because the function of the antiskating means is normally dependent only on the ratio of pressure between the needle and record to the antiskating moment. Such ratio remains constant when the shaft 40' of the pulley 4' is moved along the slot 9. Thus, the pressure between the record and needle 11' remains unchanged regardless of the position of the pulley 4' which is movable to change the antiskating moment.

The curvature of the slot 9 can be selected to correspond to the curvature of a portion of an ellipse whose foci coincide with the end portions 60' and 80'. If the slot 9 is configurated in the just-described manner, the sum of distances of the end portions 60', 80' of the biasing device 5',7' from the pulley 4' remains unchanged even if the pulley is moved to any desired position with reference to the slot 9. This means that the operator can change the antiskating moment without changing the pressure between the needle 11' and the record.

Figure 3:
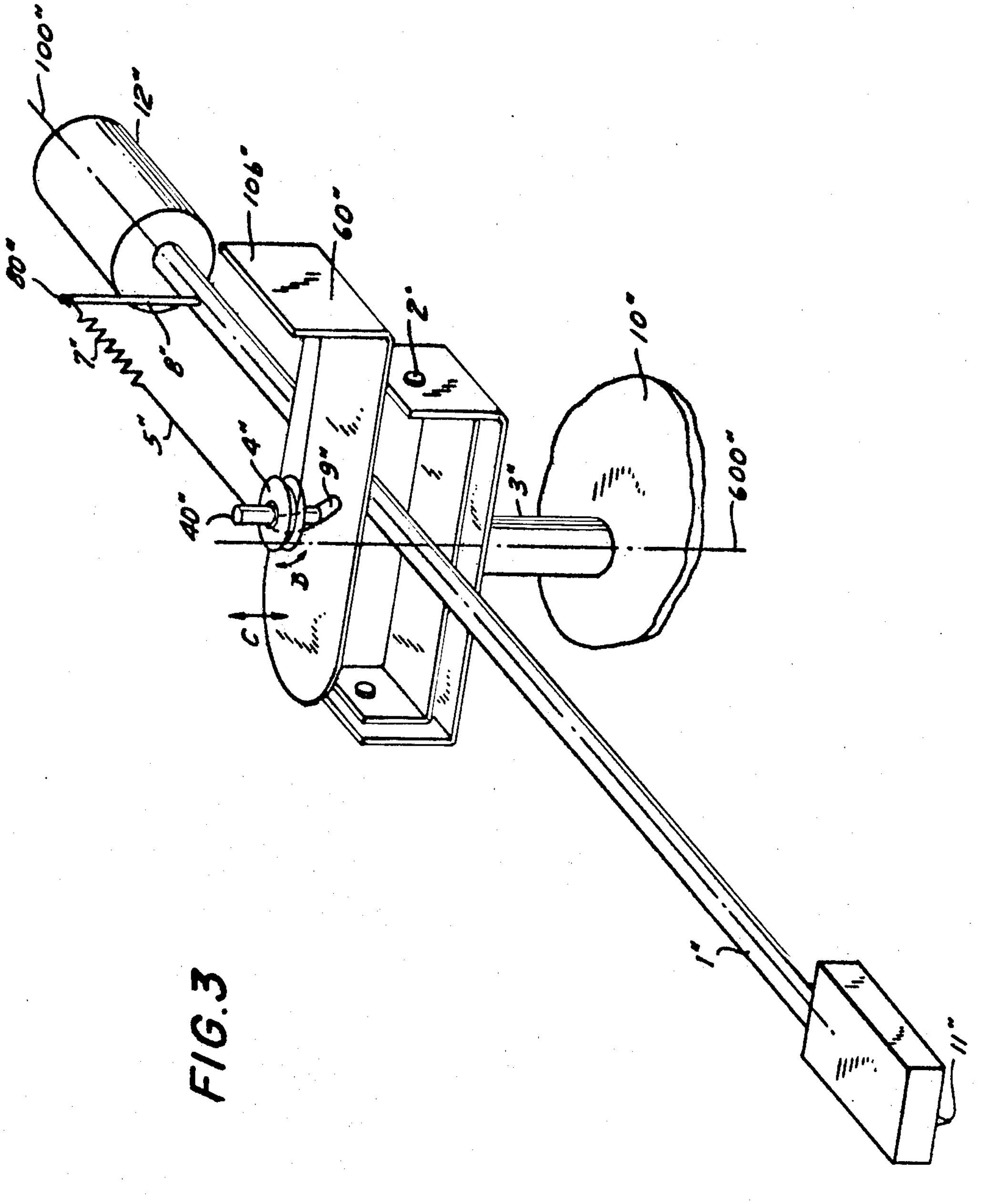
FIG. 3 is a fragmentary perspective view of a third record player which constitutes a modification of the record player shown in FIG. 2.

Referring finally to FIG. 3, there is shown a portion of a further record player wherein the end portions 60'', 80'' of the biasing device including the cord 5'' and spring 7'' are fixedly connected to the portion 10*b''* and to the post 8''. The pressure between the needle 11'' of the tone arm 1'' and the record changes in response to a change in the position of the pulley 4'' in the direction of its axis, i.e., in the direction of the axis of its shaft 40'' (see the double headed arrow C). This changes the moment which is exerted on the tone arm 1'' about the axis of the horizontal shaft 2''. Such adjustment of the pulley 4'' does not result in any or in any appreciable change in the bias of the spring 7''; therefore, the antiskating moment (tendency of the arm 1'' to rotate about the axis 600'' of the vertical shaft 3'') remains at least substantially unchanged. The antiskating moment can be changed by moving the shaft 40'' along the arcuate slot 9'' in the portion 10b'' of support 10''. The curvature of the slot 9'' shown in FIG. 3 corresponds to the curvature of a portion of an ellipse whose foci coincide with the end portions 60'', 80''; therefore, the pressure between the needle 11'' and the record can be varied while the antiskating moment remains unchanged if the pulley 4'' is adjusted in the direction of the axis of its shaft 40'' (arrow C). The pressure between the needle 11'' and the record remains unchanged if the shaft 40'' is moved along the slot 9'' to adjust the antiskating moment. The axis of the tone arm 1'' is shown at 100'' and the counterweight at 12''.

In each embodiment of my invention, the bias of the biasing device (5, 7 or 5', 7' or 5'', 7'') can be changed by moving a portion of the biasing device with reference to the support. In FIG. 1, the movable portion is the end portion 60 whose position with reference to the support 10 can be changed by rotating the adjusting screw 6. In FIG. 2, the screw 6' can change the position of the end portion 60' with reference to the housing portion 10b'. In FIG. 3, the bias of the device 5'', 7'' can be changed by moving the pulley 4'' with reference to the support 10'', i.e., the adjusting means comprises means for moving the pulley with reference to the support.

An advantage of the apparatus shown in FIGS. 2 and 3 is that the point where the biasing device is adjustable need not be adjacent to the vertical shaft 3' or 3''. The aforementioned skating moment develops as a result of friction between the record and the needle.

Without further analysis, the foregoing will so fully reveral the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In a sound reproducing apparatus, a combination comprising a support; a first pivot member mounted in said support and defining a first axis; a second pivot member mounted on said first pivot member and defining a second axis intersecting and normal to said first axis; a tone arm mounted on said second pivot member and having a record-engaging needle remote from said second axis; adjustable elongated biasing means having a first end portion fixed to said tone arm and a second end portion secured to said support, said biasing means comprising a resilient and flexible element; guide means including a pulley mounted on said second pivot member and engaging an intermediate part of said biasing means in such a way that said biasing means tends to turn said tone arm about said second axis to thereby urge said needle against a record with a force which is a function of the bias of said biasing means; and adjusting means for adjusting the bias of said biasing means, said adjusting means comprising actuating means mounting on said support outside of said tone arm and being thus accessible to adjust the bias of said biasing means while said needle tracks a record, said actuating means adjustably connecting the second end portion of said biasing means to said support so that said second end portion is movable between a plurality of positions each of which corresponds to a different bias of said biasing means.

2. A combination as defined in claim 1, wherein said first axis is vertical and said second axis is horizontal.

3. A combination as defined in claim 1, wherein said actuating means of said adjusting means is arranged to adjust the bias of said biasing means by moving the second end portion of said biasing means in the direction of said first axis.

4. A combination as defined in claim 1, wherein said biasing means comprises a helical spring one end of which constitutes the first end portion of said biasing means.

5. A combination as defined in claim 1, wherein said biasing means further comprises a flexible cord one end of which is connected with the other end of said helical spring and the other end of which constitutes the second portion of said biasing means.

6. In a sound reproducing apparatus, a combination comprising a support; a first pivot member mounted in said support and defining a first axis; a second pivot member mounted on said first pivot member and defining a second axis intersecting and normal to said first axis; a tone arm mounted on said second pivot member and having a record-engaging needle remote from said second axis; adjustable elongated flexible and resilient biasing means having a first end portion secured to said tone arm and a second end portion secured to said support; guide means including a pulley engaging an intermediate part of said biasing means in such a way that said biasing means tends to turn said tone arm about said second axis to thereby urge said needle against a record with a force which is a function of the bias of said biasing means, said pulley being mounted on one of the parts including said support and said second pivot member; and adjusting means for adjusting the bias of said biasing means, said adjusting means comprising actuating means mounted on said support outside of said tone arm and being thus accessible to adjust the bias of said biasing means while said needle tracks a record, said tone arm being movable relative to said actuating means about said first axis and said actuating means adjustably connecting said second end portion of said biasing means to said support so that said second end portion is movable between a plurality of positions each of which corresponds to a different bias of said biasing means.

7. In a sound reproducing apparatus, a combination comprising a support; a first pivot member mounted on said support and defining a first axis; a second pivot member mounted on said first pivot member and defining a second pivot axis which is substantially normal to said first axis; a tone arm mounted on said second pivot member and having a record-engaging needle remote from said second axis; adjustable elongated flexible and resilient biasing means having a first end portion secured to said tone arm and a second end portion secured to said support; guide means mounted on one of the parts including said second pivot member and said support and engaging an intermediate part of said biasing means in such a way that said biasing means tends to turn said tone arm about said second axis to thereby urge said needle against a record with a force which is a function of the bias of said biasing means; and adjusting means for adjusting the bias of said biasing means, said adjusting means including actuating means movably mounted on said support outside of said arm and being thus accessible to adjust the bias of said biasing means while said needle tracks a record, said tone arm being movable relative to said actuating means about said first axis and said actuating means being movable relative to said support and relative to said tone arm between a plurality of positions each of which corresponds to a different bias of said biasing means.

8. A combination as defined in claim 7, wherein said guide means comprises a pulley and said actuating means is arranged to adjust the bias of said biasing means by way of said pulley.

* * * * *